(12) United States Patent
Yamagata

(10) Patent No.: US 11,654,692 B2
(45) Date of Patent: May 23, 2023

(54) LIQUID EJECTING HEAD AND LIQUID EJECTING APPARATUS

(71) Applicant: SEIKO EPSON CORPORATION, Tokyo (JP)

(72) Inventor: Toshiyuki Yamagata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 43 days.

(21) Appl. No.: 17/160,794

(22) Filed: Jan. 28, 2021

(65) Prior Publication Data

US 2021/0237466 A1 Aug. 5, 2021

(30) Foreign Application Priority Data

Jan. 31, 2020 (JP) .............................. JP2020-014626

(51) Int. Cl.
*B41J 2/21* (2006.01)
*B41J 2/14* (2006.01)

(52) U.S. Cl.
CPC ........... *B41J 2/2103* (2013.01); *B41J 2/1433* (2013.01)

(58) Field of Classification Search
CPC ....... B41J 2/2103; B41J 2/1433; B41J 2/2107
See application file for complete search history.

(56) References Cited

U.S. PATENT DOCUMENTS

| | | | |
|---|---|---|---|
| 2007/0076050 A1* | 4/2007 | Sugahara | B41J 2/2103 347/40 |
| 2009/0322814 A1* | 12/2009 | Sano | B41J 2/2114 347/12 |
| 2012/0069080 A1 | 3/2012 | Yoshizawa | |
| 2017/0157921 A1* | 6/2017 | Tashiro | B41J 2/01 |

FOREIGN PATENT DOCUMENTS

| | | |
|---|---|---|
| JP | H09-131860 | 5/1997 |
| JP | 2007-011903 | 1/2007 |
| JP | 2012-066412 | 4/2012 |

* cited by examiner

*Primary Examiner* — Jason S Uhlenhake
(74) *Attorney, Agent, or Firm* — Workman Nydegger

(57) ABSTRACT

A liquid ejecting head includes: a first nozzle array and a second nozzle array through which a non-fluorescent-colored liquid is discharged; and one or more fluorescent nozzle arrays through which respective fluorescent-colored liquids are discharged. Further, the fluorescent nozzle arrays are arranged between the first nozzle array and the second nozzle array.

17 Claims, 7 Drawing Sheets

LIQUID EJECTING HEAD AND LIQUID EJECTING APPARATUS

The present application is based on, and claims priority from JP Application Serial Number 2020-014626, filed Jan. 31, 2020, the disclosure of which is hereby incorporated by reference herein in its entirety.

BACKGROUND

1. Technical Field

The present disclosure relates to a liquid ejecting head that discharges fluorescent-colored liquid and to a liquid ejecting apparatus including the liquid ejecting head. More specifically, the present disclosure relates to an ink jet recording head that discharges ink as liquid and to an ink jet recording apparatus including the ink jet recording head.

2. Related Art

Ink jet recording heads, which are one example of liquid ejecting heads, typically include parallel nozzle arrays, each of which has an array of nozzles through which an ink is discharged. Those nozzle arrays are provided in relation to reference-colored inks, such as cyan (C), magenta (M), and yellow (Y) inks.

JP-A-9-131860 discloses an ink jet recording head that includes nozzle arrays through which reference colored inks and fluorescent-colored inks are discharged.

Ink jet recording heads of the above type have a disadvantage in that they are not designed in consideration of the relationship between a method of using the inks and the sequence in which the nozzle arrays are arranged.

SUMMARY

According to a first aspect of the present disclosure, a liquid ejecting head includes: a first nozzle array and a second nozzle array through which a non-fluorescent-colored liquid is discharged; and one or more fluorescent nozzle arrays through which respective fluorescent-colored liquids are discharged. Further, the fluorescent nozzle arrays are arranged between the first nozzle array and the second nozzle array.

According to a second aspect of the present disclosure, a liquid ejecting apparatus includes the liquid ejecting head according to the first aspect.

DESCRIPTION OF EXEMPLARY EMBODIMENTS

Figure 1:
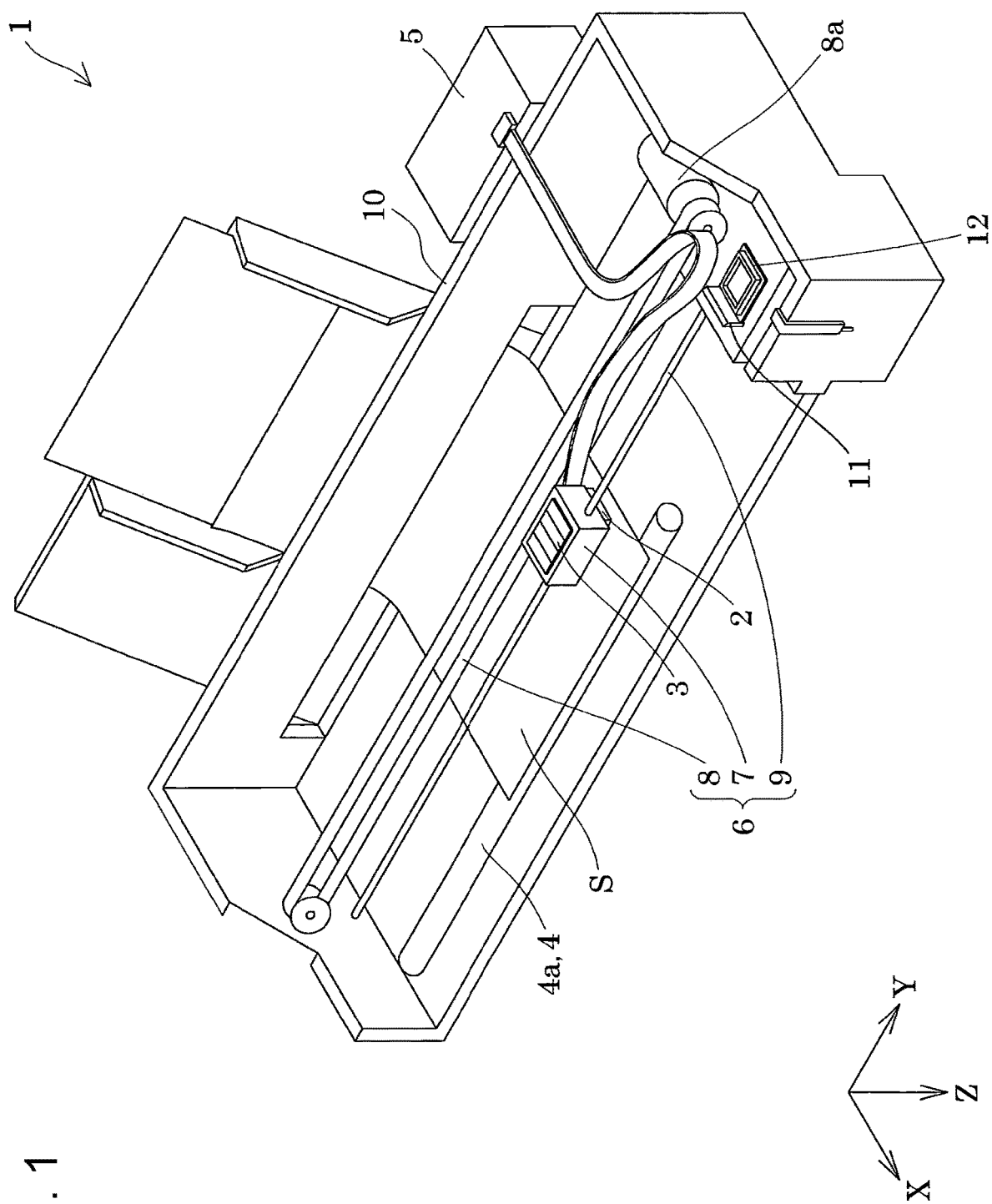
FIG. 1 is a perspective view of a skeleton configuration of a recording apparatus according to a first embodiment of the present disclosure.

Some embodiments of the present disclosure will be described below in detail with reference to the accompanying drawings. It should be noted that the following embodiments are aspects of the present disclosure and thus may be modified as appropriate within the scope of the present disclosure. In the drawings, the identical reference characters denote the same members, and thus the description of those members will not be repeated more than necessary. The X-, Y-, and Z-axes in each drawing are respective spatial axes orthogonal to one another. Herein, the direction of the arrow of the X-axis in each drawing is represented by the +X direction, whereas the opposite direction is represented by the −X direction. Likewise, the direction of the arrow of the Y-axis in each drawing is represented by the +Y direction, whereas the opposite direction is represented by the −Y direction. The direction of the arrow the Z-axis in each drawing is represented by the +Z direction, whereas the opposite direction is represented by the −Z direction.

First Embodiment

FIG. 1 is a perspective view of a skeleton configuration of an ink jet recording apparatus 1 according to a first embodiment of the present disclosure. Herein, the ink jet recording apparatus 1 is an example of a liquid ejecting apparatus.

The ink jet recording apparatus 1 is an ink jet printer configured to print letters and images, for example, on a medium S such as a print sheet. More specifically, the ink jet recording apparatus 1 discharges ink, as one type of liquid, in droplet form onto the medium S, thereby forming arrays of dots, which can constitute a desired letter or image. In this case, the medium S may be a sheet made of paper, resin, fabric, or any other material.

In this embodiment, a recording head 2 (described later) in the ink jet recording apparatus 1 is movable in the ±Y directions, which are also referred to below as the main-scanning directions, and the medium S is fed in the +X direction, which is orthogonal to the main-scanning directions. The ink jet recording head 2 has a nozzle surface extending so as to be parallel to the X-Y plane and orthogonal to the ±Z directions. The recording head 2 discharges ink droplets in the +Z direction.

The ink jet recording apparatus 1 includes: liquid containers 3; a transport mechanism 4 that feeds the medium S; a control unit 5 that acts as a controller; a movement mechanism 6; and the ink jet recording head 2. Herein, the ink jet recording head 2, which is also referred to below simply as the recording head 2, corresponds to a liquid ejecting head.

Each of the liquid containers 3 stores ink to be discharged from the recording head 2. In this embodiment, each liquid container 3 is implemented by a cartridge detachably attached to the ink jet recording apparatus 1; however, each liquid container 3 may also be a pouched ink pack made of a flexible film or a refillable ink tank. The liquid containers 3 store different colored inks separately from one another. In this embodiment, the liquid containers 3 store four colored inks: cyan (C), fluorescent yellow (FY), fluorescent pink (FP), and black (K) inks.

The control unit 5 may include: a controller (not illustrated) such as a central processing unit (CPU) or a field programmable gate array (FPGA); and a storage unit (not illustrated) such as a semiconductor memory. The control unit 5 executes programs stored in the storage unit, thereby causing the control unit 5 to have centralized control over the transport mechanism 4, the movement mechanism 6, the recording head 2, and other components in the ink jet recording apparatus 1.

The transport mechanism 4 has a transport roller 4a that feeds the medium S in the +X direction, under the control of the control unit 5. Alternatively, the transport mechanism 4 may feed the medium S with a belt or drum instead of the transport roller 4a.

The movement mechanism 6 moves the recording head 2 in the ±Y directions, under the control of the control unit 5. In this case, the ±Y directions in which the movement mechanism 6 moves the recording head 2 are orthogonal to the +X direction in which the transport mechanism 4 feeds the medium S.

In this embodiment, the movement mechanism 6 includes a transport unit 7, a transport belt 8, and a guide rail 9. The transport unit 7 may be a box-shaped structure called a carriage, which accommodates the recording head 2 and is fixed to the transport belt 8. The transport belt 8 may be an endless belt extending along the X-axis. When supplied with the drive power of a drive motor 8a under the control of the control unit 5, the transport belt 8 runs to move both the recording head 2 and the transport unit 7 along the guide rail 9 in the ±Y directions. Instead of inside the recording head 2, the liquid containers 3 may be disposed inside a main body 10 separately from the recording head 2.

Disposed near one side of the main body 10 in the main-scanning directions, more specifically, the +Y side of the main body 10 in this embodiment, is a wiper 11 that sweeps the nozzle surface (described later) of the recording head 2; the nozzle surface has apertures of the nozzles thereon. The wiper 11 may be made of an elastic, flexible material such as rubber or elastomer. To sweep the nozzle surface, the wiper 11 moves relative to the nozzle surface with its one side kept in contact with the nozzle surface. The mechanism for sweeping the nozzle surface is not limited to the wiper 11. Alternatively, the sweeping mechanism may be a sheet-shaped wiper made of nonwoven fabric cloth, for example.

Disposed adjacent to the wiper 11 is a cap 12. More specifically, the cap 12 is positioned near the +Y side of the main body 10, namely, at the home position where the transport unit 7 is on standby. The cap 12, which may take the shape of a tray, receives the nozzle surface of the recording head 2. The cap 12 has an enclosed inner space that accommodates the nozzles 23 (described later) of the recording head 2 when the nozzle surface is in contact with the cap 12. The cap 12 is coupled to a pump via a waste liquid tube (not illustrated). This pump can generate a negative pressure inside the enclosed inner space of the cap 12.

Figure 2:
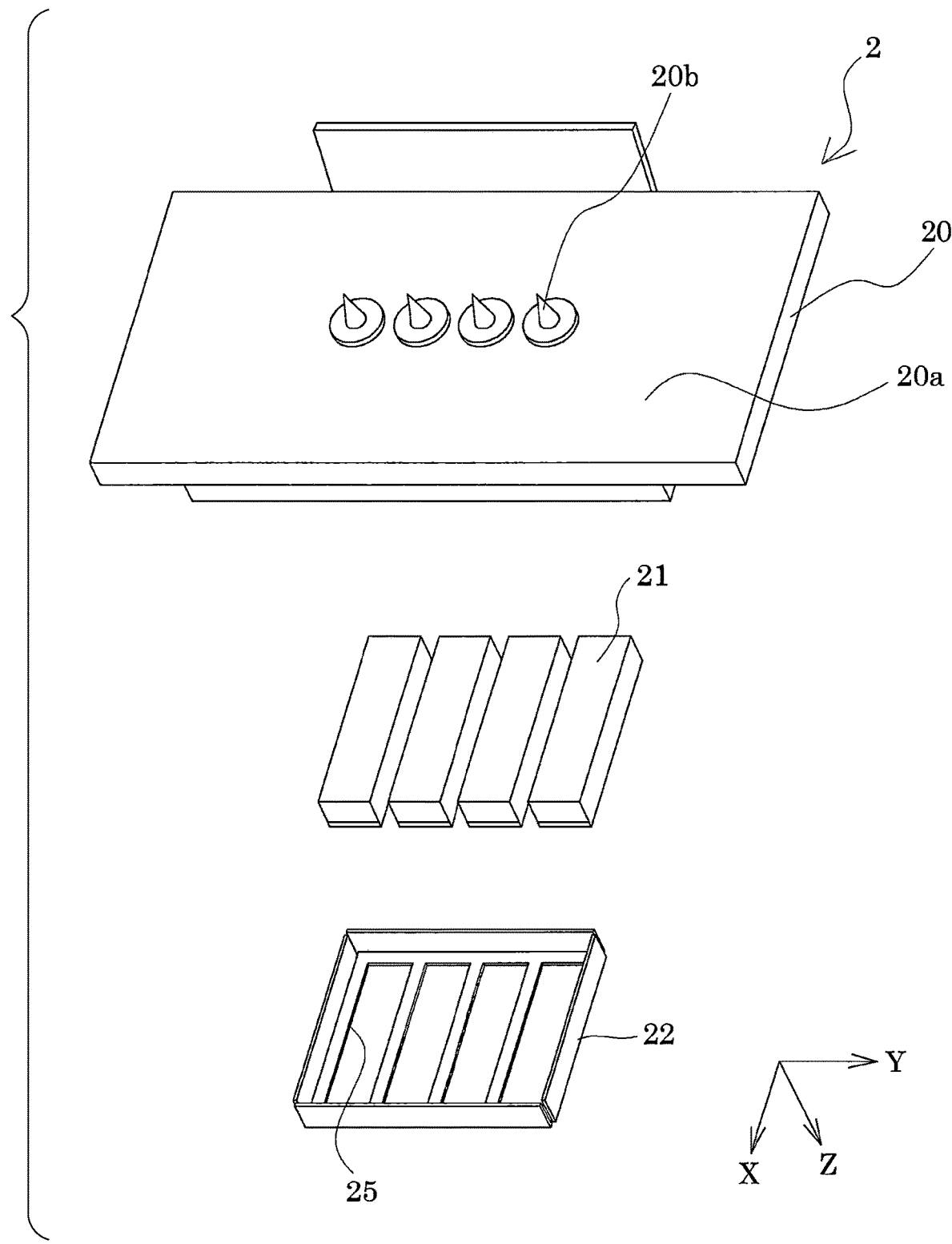
FIG. 2 is an exploded, perspective view of a skeleton configuration of the recording head.
Figure 3:
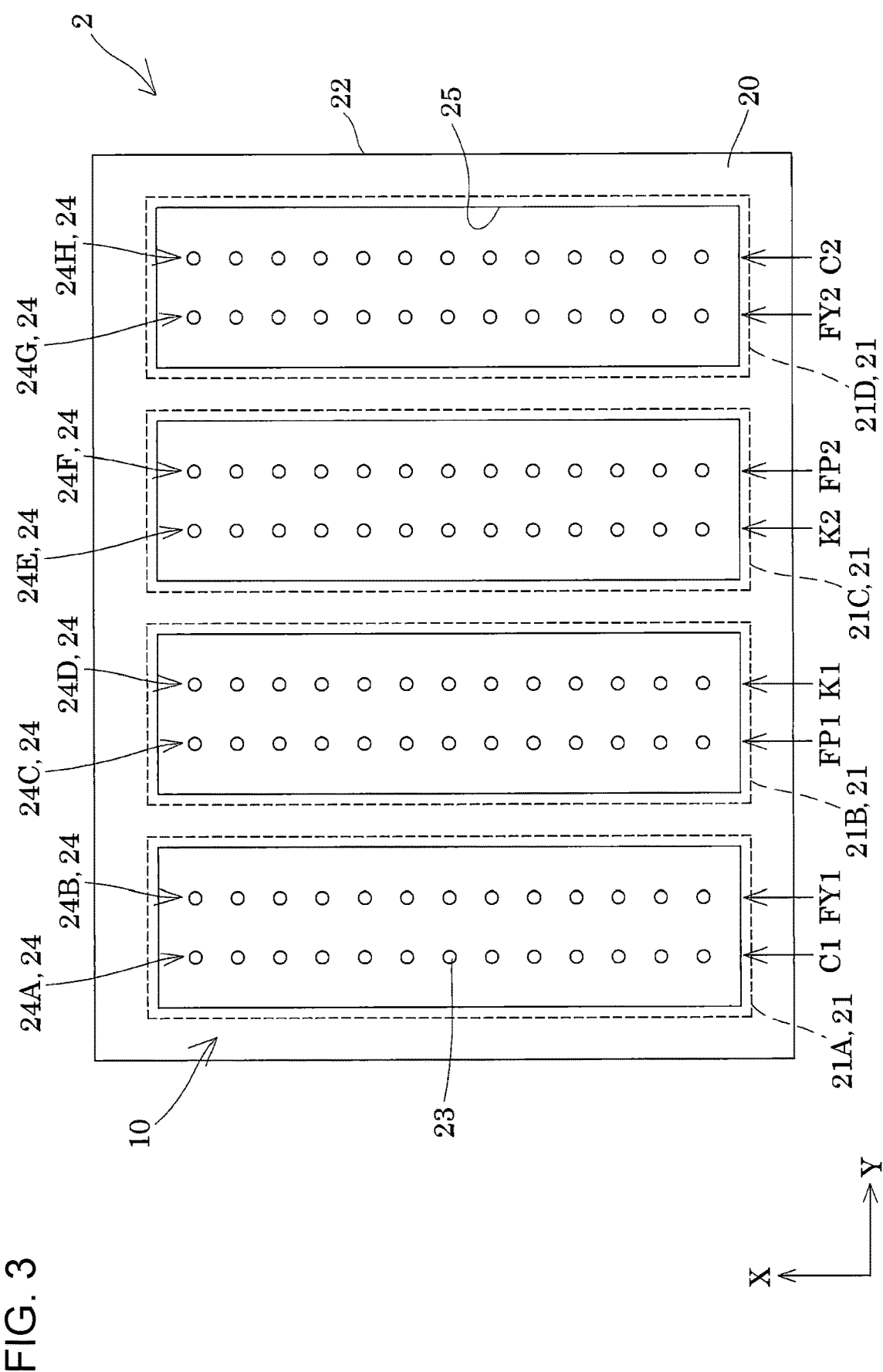
FIG. 3 is a plan view of a nozzle surface of the recording head.

With reference to FIGS. 2 and 3, the recording head 2 will be described in detail below. FIG. 2 is an exploded, perspective view of a skeleton configuration of the recording head 2; FIG. 3 is a plan view of the nozzle surface of the recording head 2. It should be noted that the holder member 20 is not illustrated in FIG. 3.

As illustrated in FIG. 2, the recording head 2 includes: the holder member 20; a plurality of drivers 21; and a cover head 22.

The holder member 20 has a liquid container attachment 20a on its −Z-side surface, to which the liquid containers 3 each formed of an ink cartridge is to be attached. The liquid container attachment 20a has a plurality of connectors 20b to be coupled to the liquid containers 3. In this embodiment, each connector 20b takes the shape of a needle and is to be inserted into the liquid containers 3. At the ends of connectors 20b in the −Z direction, passages (not illustrated) provided inside the holder member 20 are exposed. The holder member 20 may have filters inside in order to remove foreign matter or bubbles from the inks.

The drivers 21, which discharge the inks as liquids, are to be fixed to the +Z-side surface of the holder member 20. In this embodiment, four drivers 21 are provided in the recording head 2 and each have nozzles 23 on its +Z-side surface, as illustrated in FIG. 3, through which the liquids, or inks, are to be discharged in droplet form. In this embodiment, the +Z-side surface of each driver 21 is provided with two nozzle arrays 24 arranged side by side along the Y-axis; each nozzle array 24 includes a plurality of nozzles 23 arrayed along the X-axis. Since the four drivers 21 are provided in the recording head 2, a total of eight nozzle arrays 24 are arranged side by side. In this embodiment, the nozzles 23 of the nozzle arrays 24 in the drivers 21 are aligned with one another along the Y-axis. In short, the drivers 21 are disposed so that the nozzles 23 in all the nozzle arrays 24 are aligned with one another along the Y-axis. Although two nozzle arrays 24 are formed in each driver 21 in this embodiment, any other number of nozzle arrays 24 may be formed therein. It should be noted that the nozzles 23 in each of the nozzle arrays 24 in the drivers 21 do not necessarily have to be arranged along the X-axis. Alternatively, the nozzles 23 may be formed in the X-Y plane, namely, on the nozzle surface while inclined with respect to both the X- and Y-axes.

Each driver 21 includes inside: passages leading to corresponding nozzles 23; and pressure generators that apply varying pressures to the inks inside the passages. Each pressure generator may have a piezoelectric actuator made of a piezoelectric material that converts electricity into mechanical force. In this case, the piezoelectric actuator may be deformed to vary the inner volume of the liquid passage to change the pressure applied to the ink, which discharges the ink in droplet form from the recording head 2 through the nozzles 23. Alternatively, each pressure generator may have a heater element in the passage. In this case, the heater element may generate heat to form bubbles, which causes the ink to be discharged in droplet form through the nozzles 23. Alternatively, each pressure generator may have an electrostatic actuator. In this case, the electrostatic actuator generates electrostatic force between a vibration plate and electrodes, which deforms the vibration plate to discharge the ink in droplet form through the nozzles 23. In this embodiment, the passage leading to the nozzles 23 in one nozzle array 24 in each driver 21 does not communicate with the passage leading to the nozzles 23 in the other nozzle array 24. Therefore, each driver 21 can discharge different inks separately through the respective nozzle arrays 24.

The cover head 22 is disposed on the +Z-side surface of the recording head 2 in order to protect the nozzle surface on which the nozzles 23 of the drivers 21 are exposed. Herein, the nozzle surface refers to the plane in which the nozzles 23 through which the recording head 2 discharges the inks are exposed. The cover head 22 has a plurality of exposed apertures 25 through which the nozzle arrays of the drivers 21 are exposed on the nozzle surface. In this embodiment, four exposed apertures 25 are arranged side by side along the Y-axis in relation to the respective drivers 21. Herein, the surfaces of the drivers 21 on which the nozzles 23 are exposed through the exposed apertures 25 and the +Z-side surface of the cover head 22 on which the exposed apertures 25 are formed are collectively referred to as the nozzle surface. Since the recording head 2 is provided with the four drivers 21, a total of eight nozzle arrays 24 are formed on the nozzle surface.

The drivers 21 in the recording head 2 are referred to as the drivers 21A, 21B, 21C, and 21D in this order from the −Y-side to the +Y-side. Likewise, the nozzle arrays 24 formed in the recording head 2 are referred to as the nozzle array 24A, 24B, 24C, 24D, 24E, 24F, 24G, and 24H in this order from the −Y-side to the +Y-side. In short, the driver 21A is provided with the nozzle arrays 24A and 24B; the driver 21B is provided with the nozzle arrays 24C and 24D; the driver 21C is provided with the nozzle arrays 24E and 24F; and the driver 21D is provided with the nozzle arrays 24G and 24H.

Through the nozzle arrays 24A and 24H, a non-fluorescent-colored ink, or a cyan (C) ink in this embodiment, is discharged. In this embodiment, the cyan (C) ink is supplied from the same liquid container 3 and discharged through the nozzle arrays 24A and 24H. Hereinafter, the cyan (C) ink discharged through the nozzle array 24A is referred to as the cyan (C1) ink, whereas the cyan (C) ink discharged through the nozzle array 24H is referred to as the cyan (C2) ink.

Through the nozzle arrays 24B and 24G, a fluorescent yellow (FY) ink is discharged. In this embodiment, the fluorescent yellow (FY) ink is supplied from the same liquid container 3 and discharged through nozzle arrays 24B and 24G. Hereinafter, the fluorescent yellow (FY) ink discharged through the nozzle array 24B is referred to as the fluorescent yellow (FY1) ink, whereas the fluorescent yellow (FY) ink discharged through the nozzle array 24G is referred to as the fluorescent yellow (FY2) ink.

Through the nozzle arrays 24C and 24F, a fluorescent pink (FP) ink is discharged. In this embodiment, the fluorescent pink (FP) ink is supplied from the same liquid container 3 and discharged through nozzle arrays 24C and 24F. Hereinafter, the fluorescent pink (FP) ink discharged through the nozzle array 24C is referred to as the fluorescent pink (FP1) ink, whereas the fluorescent pink (FP) ink discharged through the nozzle array 24F is referred to as the fluorescent pink (FP2) ink.

Through the nozzle arrays 24D and 24E, a black (K) ink is discharged. In this embodiment, the black (K) ink is supplied from the same liquid container 3 and discharged through nozzle arrays 24D and 24E. Hereinafter, the black (K) ink discharged through the nozzle array 24D is referred to as the black (K1) ink, whereas the black (K) ink discharged through the nozzle array 24E is referred to as the black (K2) ink.

When the inks are discharged from the recording head 2 in droplet form, some of the droplets turn to a mist, which would float and spread out inside the ink jet recording apparatus 1. In this phenomenon, there are cases in which a mist generated from a fluorescent-colored ink, such as the fluorescent yellow (FY) ink or the fluorescent pink (FP) ink, contains particles smaller in diameter than those contained in a mist generated from a non-fluorescent-colored ink, such as the cyan (C) ink or the black (K) ink. Therefore, during the printing by the recording head 2, there are cases in which a larger amount of mist is generated when a fluorescent-colored ink is discharged through a nozzle array 24 than when a non-fluorescent-colored ink is discharged through another nozzle array 24.

In this embodiment, the nozzle arrays 24B and 24G through which the fluorescent yellow (FY) ink is discharged and the nozzle arrays 24C and 24F through which the fluorescent pink (FP) ink is discharged are all disposed between the nozzle arrays 24A and 24H through which a non-fluorescent-colored (C) ink is discharged. Herein, the nozzle array 24H corresponds to a first nozzle array; nozzle array 24A corresponds to a second nozzle array; and each of the nozzle arrays 24B, 24C, 24G, and 24F corresponds to a fluorescent nozzle array. As a result, the nozzle arrays 24B, 24C, 24F, and 24G through which fluorescent-colored inks are discharged can be all disposed on the nozzle surface relatively close to the center. This arrangement suppresses the mists generated from ink droplets from the nozzle arrays 24B, 24C, 24F, and 24G from floating inside the ink jet recording apparatus 1. Instead, the arrangement allows the mists to adhere to the nozzle surface of the recording head 2. In this embodiment, areas each corresponding to at least one nozzle array 24 are reserved on the ±Y-sides of each of the nozzle arrays 24B, 24C, 24F, and 24G on the nozzle surface. Thus, when the recording head 2 discharges ink droplets through the nozzle arrays 24B, 24C, 24F, and 24G, the mists generated in the above manner tends to float and spread out in the ±Y directions in accordance with the movement of the recording head 2 and then adhere to those areas. Therefore, this arrangement successfully suppresses the mists generated from ink droplets discharged through the nozzle arrays 24B, 24C, 24F, and 24G from floating and spreading out inside the ink jet recording apparatus 1. For example, if the recording head 2 discharged a fluorescent-colored ink through the nozzle array 24A while moving in the +Y direction, the mist would float toward the back of the recording head 2 and spread out inside the ink jet recording apparatus 1 rather than adhering to the nozzle surface, because no area corresponding to the one nozzle array is reserved on the −Y-side of the nozzle array 24A. However, as described above, the fluorescent nozzle arrays through which fluorescent-colored inks are discharged are all arranged between the first nozzle array and the second nozzle array through which a non-fluorescent-colored ink is discharged. This arrangement enables areas to be reserved more widely on both sides of each fluorescent nozzle array than on both sides of each of the first nozzle array and the second nozzle array. Consequently, the mists generated from the fluorescent-colored inks discharged through the fluorescent nozzle arrays tend to adhere to the nozzle surface rather than floating and spreading out from the recording head 2 to the interior of the ink jet recording apparatus 1. When the mists generated from ink droplets discharged through the nozzle arrays 24B, 24C, 24F, and 24 adhere to the nozzle surface, the wiper 11 sweeps the nozzle surface to remove the mists from the nozzle surface, thereby suppressing the mists that have adhered to the nozzle surface from causing any discharge failure or other malfunctions of the ink jet recording apparatus 1.

Figure 4:
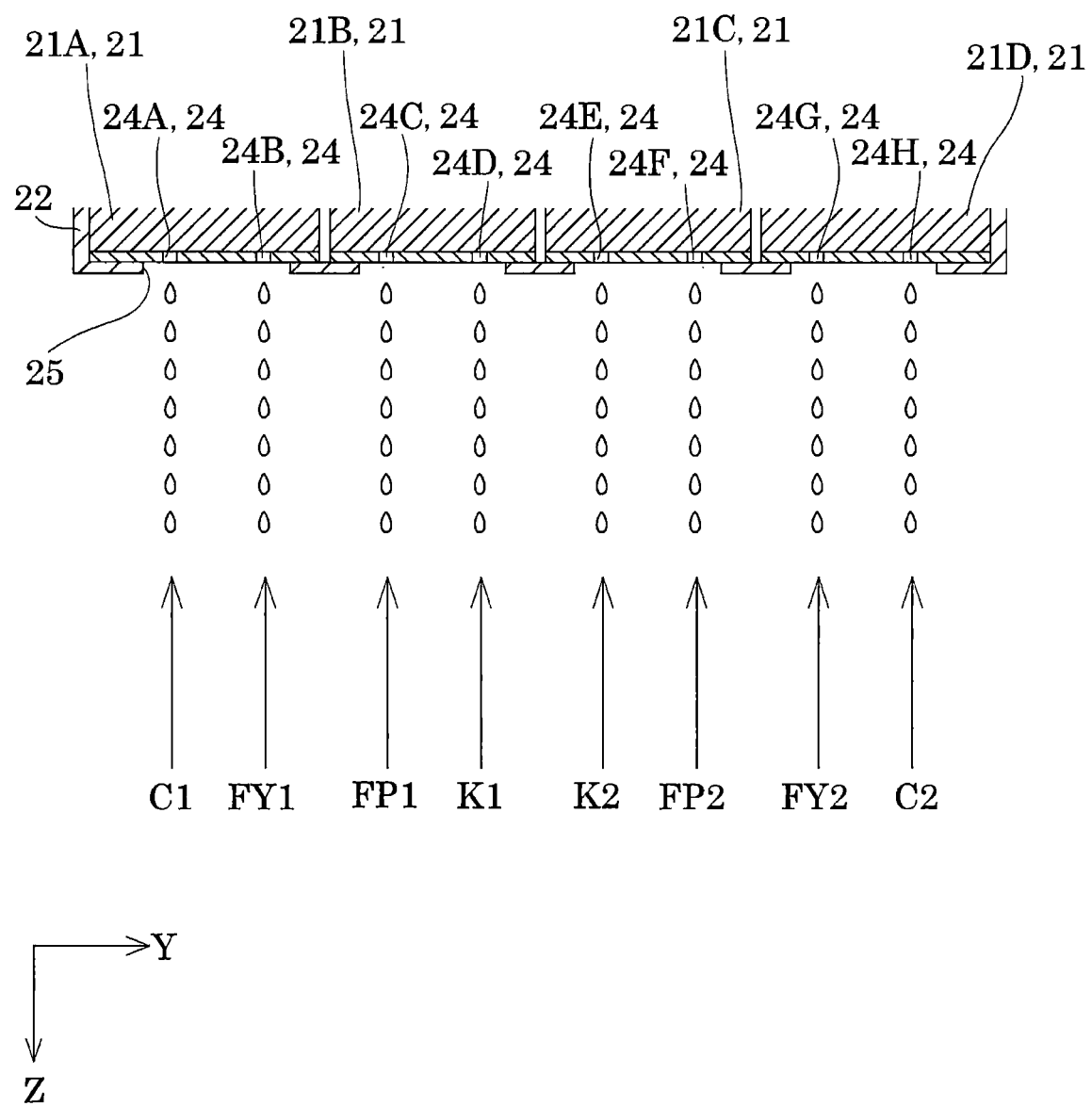
FIG. 4 illustrates ink droplets discharged from the recording head through the nozzle arrays.

As illustrated in FIG. 4, droplets of the fluorescent-colored inks successively discharged through the nozzle arrays 24A and 24H create airflows within the region on the ±Y- and +Z-sides of the nozzle arrays 24B, 24C, 24F, and 24G. As described above, the nozzle arrays 24B and 24G through which the fluorescent yellow (FY) ink is discharged and the nozzle arrays 24C and 24F through which the fluorescent pink (FP) ink is discharged are all arranged between the nozzle arrays 24A and 24H through which the non-fluorescent-colored ink, or cyan (C) ink, is discharged. In this case, the ink droplets successively discharged through the nozzle arrays 24A and 24H create the airflows that act as air curtains. These air curtains suppress the mists generated from the fluorescent-colored inks discharged through the nozzle arrays 24B, 24C, 24F, and 24G from spreading out in the ±Y directions. As a result, the mists generated from the fluorescent-colored inks discharged through the nozzle arrays 24B, 24C, 24F, and 24G stay within the region defined the ink droplets discharged through the nozzle arrays 24A and 24H and on the +Z-side of the nozzle surface, thereby suppressing the mists from floating and spreading out inside the ink jet recording apparatus 1.

The expression "arrangement of the nozzle arrays 24B, 24C, 24F, and 24G between the nozzle arrays 24A and 24H" means that the nozzle arrays 24B, 24C, 24F, and 24G are all arranged within the region defined between the nozzle arrays 24A and 24H on the Y-axis along which the transport unit 7 moves relative to medium S. In this case, the nozzle arrays 24B, 24C, 24F, and 24G may be partly positioned outside this region in the +X or −X direction. However, at least half of all the nozzles 23 arrayed in each of nozzle arrays 24B, 24C, 24F, and 24G along the X-axis are preferably positioned within the region in the ±X directions.

As described above, the nozzle arrays 24B and 24G through which the fluorescent yellow (FY) ink is discharged and the nozzle arrays 24C and 24F through which the fluorescent pink (FP) ink is discharged are all arranged between the nozzle arrays 24A and 24H through which the non-fluorescent-colored ink, or cyan (C) ink, is discharged. In this case, it is possible to form a dot of a non-fluorescent-colored ink over or under a dot of a fluorescent-colored ink on the medium S. Currently, fluorescent yellow (FY) ink and fluorescent pink (FP) ink are widely used as fluorescent dye inks. In order to provide a cyan (C) ink with a fluorescent property, it is necessary to mix a fluorescent yellow (FY) ink and the cyan (C) ink on the medium S. In this way, a fluorescent pseudo-cyan image can be formed. This method may be used to form not only a fluorescent-colored dye ink but also a fluorescent-colored pigment ink.

Figure 5:
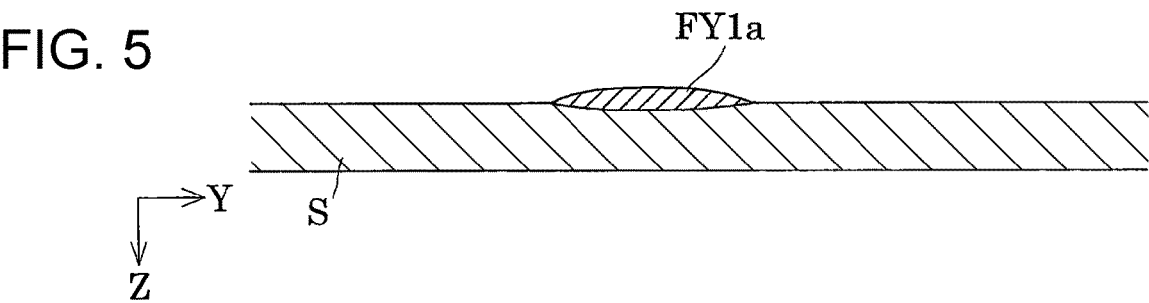
FIG. 5 is a cross-sectional view of a first dot formed on a medium by the recording head.
Figure 6:
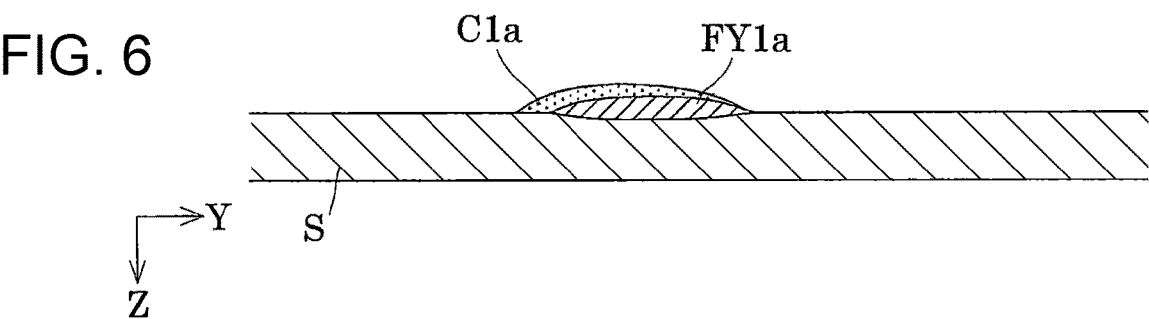
FIG. 6 is a cross-sectional view of the first dot and a second dot formed on the medium by the recording head.

A description will be given below of a method of forming a fluorescent pseudo-bluish image on the medium S by using a non-fluorescent cyan (C) ink and a fluorescent yellow (FY) ink. FIGS. 5 and 6 are each a cross-sectional view of dots formed on the medium S with a fluorescent yellow (FY) ink and a non-fluorescent cyan (C) ink.

When the recording head 2 discharges ink droplets onto the medium S while moving relative to the medium S in the +Y direction, the fluorescent yellow (FY1) ink discharged through the nozzle array 24B first lands on the medium S to form a dot FY1a thereon, as illustrated in FIG. 5. Then, the recording head 2 further moves relative to the medium S in the +Y direction, and the cyan (C1) ink discharged through the nozzle array 24A lands over the dot FY1a to form a dot C1a thereon, as illustrated in FIG. 6. In this way, while moving in the +Y direction, the recording head 2 can form the dot C1a over the dot FY1a by sequentially discharging droplets of the fluorescent yellow (FY1) ink through the nozzle array 24B and droplets of the cyan (C1) ink through the nozzle array 24A. Consequently, it is possible to sufficiently emphasize coloring of the cyan (C) of the dot C1a. As described above, the nozzle arrays 24B, 24C, 24F, and 24G through which fluorescent-colored inks are discharged are all arranged between nozzle arrays 24A and 22H through which a non-fluorescent-colored ink is discharged. With this arrangement, the recording head 2 can form a non-fluorescent-colored ink over a fluorescent-colored ink dot on the medium S while moving in the +Y direction, thereby successfully providing this non-fluorescent-colored ink with a fluorescent property.

In this embodiment, the colors of inks discharged from the recording head 2 through the nozzle arrays 24A to 22H are arranged symmetrically along the Y-axis. More specifically, the color sequence in which the inks discharged through the nozzle arrays 24E, 24F, 24G, and 24H are arranged from the center of the recording head 2 to the +Y-side is set to be the same as that in which the inks discharged through of nozzle array 24D, 24C, 24B, and 24A arranged from the center of the recording head 2 to the −Y-side. In this case, the black (K), fluorescent pink (FP), fluorescent yellow (FY), and cyan (C) colors are arranged in sequence. With this color sequence, the recording head 2 can form a non-fluorescent-colored ink dot over a fluorescent-colored ink dot on the medium S, regardless of in which direction the recording head 2 moves relative to the medium S. For example, when moving relative to the medium S in the −Y direction, the recording head 2 can discharge the fluorescent yellow (FY2) ink onto the medium S through the nozzle array 24G to form a fluorescent yellow dot thereon and then discharges the cyan (C2) ink onto the medium S through the nozzle array 24H to form a cyan dot over the fluorescent yellow dot. As described above, when moving relative to the medium S in either of the ±Y directions, the recording head 2 can form a non-fluorescent-colored ink dot over a fluorescent-colored ink dot on the medium S, thereby providing the non-fluorescent color with a fluorescent property to sufficiently emphasize the coloring. In this way, it is possible to achieve quality color printing. For example, the recording head 2 can print a fluorescent pseudo-reddish image on the medium S by discharging both the cyan (C) ink and the fluorescent pink (FP) ink. In this case, the recording head 2 only has to form a cyan (C) ink dot over a fluorescent pink (FP) ink dot on the medium S. As an alternative configuration, the recording head 2 may have only four nozzle arrays 24: the nozzle arrays 24A, 24B, 24C, and 24D. In this case, however, the recording head 2 needs to move at a lower speed because the recording head 2 forms the cyan (C1) ink dot over the fluorescent yellow (FY1) ink dot on the medium S only when moving in the +Y direction. This means that the order in which the recording head 2 can discharge the inks through nozzle array 24A, 24B, 24C, and 24D when the recording head 2 moves relative to the medium S in the −Y direction is opposite to that when it moves in the +Y direction.

Figure 7:
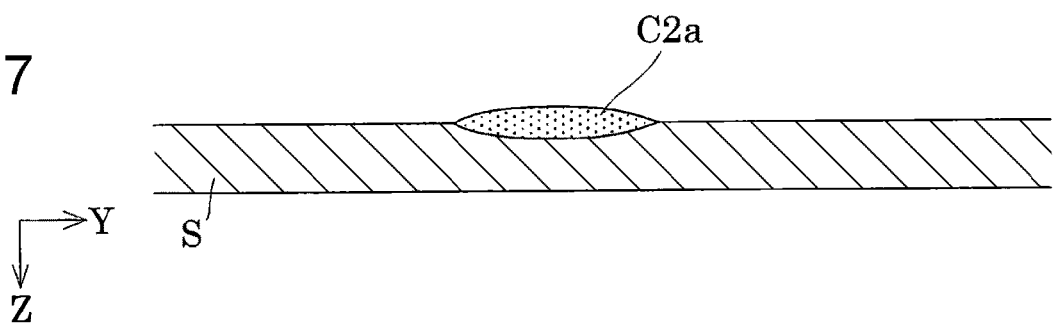
FIG. 7 is a cross-sectional view of a first dot formed on the medium by the recording head.
Figure 8:
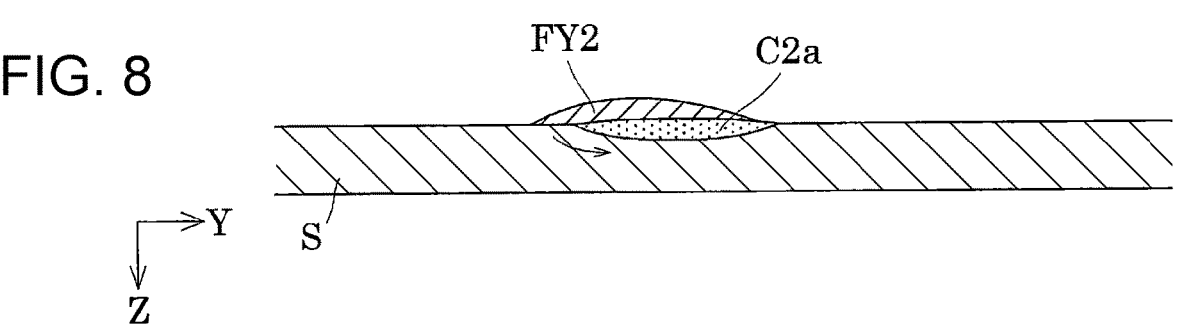
FIG. 8 is a cross-sectional view of the first dot and a second dot formed on the medium by the recording head.
Figure 9:
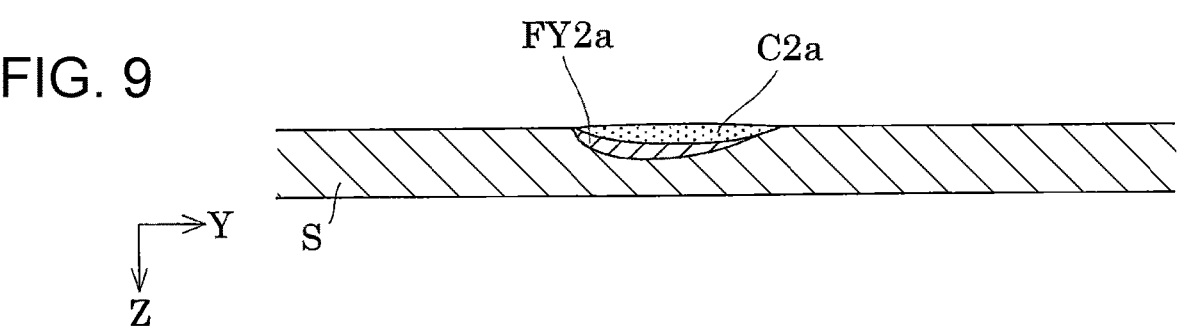
FIG. 9 is a cross-sectional view of the first and second dots formed on the medium by the recording head.

In the example of FIGS. 5 and 6, a second ink that has landed on the medium S later than a first ink is positioned on the uppermost layer and thus dominates the creation of the resultant color. Depending on the combination of the colors of the first and second inks, however, the first ink that has landed on the medium S earlier than the second ink is positioned on the uppermost layer and dominants the creation of the resultant color. An example of this case will be described with reference to FIGS. 7 to 9. FIGS. 7 to 9 are each a cross-sectional view of dots formed on the medium S with the cyan (C2) ink and the fluorescent yellow (FY2) ink.

When the recording head 2 discharges ink droplets onto the medium S while moving relative to the medium S in the +Y direction, the cyan (C2) discharged through the nozzle array 24H first lands on the medium S to form a dot C2a thereon, as illustrated in FIG. 7. Then, the recording head 2 further moves relative to the medium S in the +Y direction, and the fluorescent yellow (FY2) ink discharged through the nozzle array 24G lands over the dot C2a, as illustrated in FIG. 8. In this case, the fluorescent yellow (FY2) ink flows to beneath the cyan dot C2a that has already sunk to the medium S, thereby forming a dot FY2a, as illustrated in FIG. 9. As a result, the dot C2a of the cyan (C2) ink is formed over the dot FY2a of the fluorescent yellow (FY2) ink, thereby sufficiently exhibiting its cyan color on the uppermost layer of the medium S. Also, the recording head 2 can print a fluorescent pseudo-reddish image on the medium S by using the non-fluorescent cyan (C) ink and the fluorescent pink (FP) ink. Since the nozzle arrays 24B, 24C, 24F, and 24G through which fluorescent-colored inks are discharged are all arranged between the nozzle arrays 24A and 22H through which a non-fluorescent-colored ink is discharged, the recording head 2 can form a non-fluorescent-colored ink dot over a fluorescent-colored ink dot on the medium S while moving in +Y or −Y direction, thereby providing the non-fluorescent color with a fluorescent property.

In this embodiment, as described above, the color sequence in which inks discharged from the recording head 2 through the nozzle arrays 24A, 24B, 24C, 24D, 24E, 24F, 24G, and 22H are arranged is set symmetrically along the Y-axis. With this color sequence, the recording head 2 can form a non-fluorescent-colored ink dot over a fluorescent-colored ink dot on the medium S, regardless of in which direction the recording head 2 moves relative to the medium S. For example, when moving relative to the medium S in the −Y direction, the recording head 2 can discharge the cyan (C1) ink onto the medium S through the nozzle array 24A to form a cyan (C1) ink dot thereon and then discharges the fluorescent yellow (FY1) ink onto the cyan (C1) ink dot on the medium S through the nozzle array 24B. This fluorescent yellow (FY1) ink flows to beneath the cyan (C1) ink dot so that the cyan (C1) ink dot is positioned on the uppermost layer. Also, the recording head 2 can print a fluorescent pseudo-reddish image on the medium S by using the non-fluorescent cyan (C) ink and the fluorescent pink (FP) ink. As described above, when moving relative to the medium S in either of the ±Y directions, the recording head 2 can from a non-fluorescent-colored ink dot over a fluorescent-colored ink dot on the medium S, thereby providing the non-fluorescent color with a fluorescent property to sufficiently emphasize the coloring. In this way, it is possible to achieve quality color printing at a high speed.

In this embodiment, as described above, the nozzle arrays 24B and 24G through which the fluorescent yellow (FY) ink is discharged are both arranged between the nozzle arrays 24A and 24H through which the non-fluorescent cyan (C) ink is discharged. Herein, the nozzle arrays 24B and 24G through which the fluorescent yellow (FY) ink is discharged correspond to a first fluorescent nozzle array. With this arrangement, the recording head 2 can form a non-fluorescent cyan (C) ink dot over a fluorescent yellow (FY) ink dot on the medium S, thereby successfully printing a fluorescent pseudo-bluish image. Furthermore, the nozzle arrays 24C and 24F through which the fluorescent pink (FP) ink is discharged are both arranged between the nozzle arrays 24A and 24H through which the non-fluorescent cyan (C) ink is discharged. Herein, the nozzle arrays 24C and 24F through which the fluorescent pink (FP) ink is discharged correspond to a second fluorescent nozzle array. With this arrangement, the recording head 2 can form a non-fluorescent cyan (C) ink dot over a fluorescent pink (FP) ink dot on the medium S, thereby successfully printing a fluorescent pseudo-reddish image on the medium S.

In this embodiment, the nozzle arrays 24C and 24F through which the fluorescent pink (FP) ink is discharged are both arranged between the nozzle arrays 24B and 24G through which the fluorescent yellow (FY) ink is discharged. Herein, the fluorescent yellow (FY) corresponds to a first fluorescent color, whereas the fluorescent pink (FP) corresponds to a second fluorescent color. Furthermore, the nozzle arrays 24B and 24G through which the fluorescent yellow (FY) ink is discharged correspond, respectively, to the third and fourth fluorescent nozzle arrays, whereas the nozzle arrays 24C and 24F through which the fluorescent pink (FP) is discharged correspond to the second fluorescent nozzle array. If the medium S has a whitish color as in this embodiment, fluorescent pink has higher visibility relative to the medium S than that of the fluorescent yellow. For this reason, the fluorescent yellow (FY) corresponds to the first fluorescent color, whereas the fluorescent pink (FP) corresponds to the second fluorescent color, as described above. Herein, a color having high visibility refers to a color that highly differs in lightness, chroma, and hue from a background color, namely, from a color of a medium. The expression "the nozzle arrays 24C and 24F are arranged between the nozzle arrays 24B and 24G" means that the nozzle arrays 24C and 24F are arranged within the region defined between the nozzle arrays 24B and 24G in the ±Y direction in which the transport unit 7 moves relative to the medium S. In this case, the nozzle arrays 24C and 24F may be partly positioned outside this region in the +X or −X direction. However, at least half of all the nozzles 23 arrayed in each of the nozzle arrays 24C and 24F along the X-axis are preferably positioned within the region in the ±X directions.

As described above, the nozzle arrays 24C and 24F through which the fluorescent pink (FP1 and FP2) inks, respectively, are discharged are both arranged between the nozzle arrays 24B and 24G through which the fluorescent yellow (FY1 and FY2) inks, respectively, are discharged. With this arrangement, the nozzle arrays 24C and 24F can be positioned relatively close to each other along the Y-axis. In addition, the nozzle arrays 24C and 24F are also positioned closer to the center of the recording head 2 along the Y-axis than the nozzle arrays 24B and 24G are. In this case, the fluorescent pink (FP1 and FP2) inks have higher visibility relative to the medium S than that of the fluorescent yellow (FY1 and FY2) inks. Thus, the arrangement of the nozzle arrays 24C and 24F through which the fluorescent pink (FP1 and FP2) inks close to each other along the Y-axis makes it possible to suppress ink droplets discharged through the nozzle arrays 24C and 24F from deviating from the target locations on the medium S along the X-axis, even when the recording head 2 is attached to the transport unit 7 in an angled position within the X-Y plane. Consequently, this arrangement successfully achieves quality printing.

In this embodiment, the nozzle arrays 24D and 24E through which the black (K) ink, which has higher visibility than that of the cyan (C) ink, is discharged are both arranged between the nozzle arrays 24C and 24F through which the fluorescent pink (FP) ink is discharged. The black (K) ink discharged through the nozzle arrays 24D and 24E differs in color from the cyan (C) ink discharged through the nozzle arrays 24A and 24H, and an image printed on the medium S with the black (K) ink has higher visibility than that of an image printed with the cyan (C) ink. Herein, a color having high visibility refers to a color that highly differs in lightness, chroma, and hue from a background color, namely, from a color of a medium. In this embodiment, when the medium S has a whitish color, black (K) has higher visibility relative to the medium S than that of cyan (C). Herein, cyan (C) corresponds to a second color, whereas black (K), which has high visibility than that of the second color, corresponds to the first color. The nozzle arrays 24D and 24E through which an ink of the first color is discharged correspond to a third nozzle array, whereas the nozzle arrays 24C and 24F through which a fluorescent pink ink is discharged correspond, respectively, to fifth and sixth fluorescent nozzle arrays. The expression "the nozzle arrays 24D and 24E through which the black (K) ink is discharged are arranged between the nozzle arrays 24C and 24F through which the fluorescent pink (FP) ink is discharged" means that the nozzle arrays 24D and 24E are arranged within the region defined between the nozzle arrays 24C and 24F in the ±Y directions in which the transport unit 7 moves relative to the medium S. In this case, the nozzle arrays 24D and 24E may be partly positioned outside this region in the +X or −X direction. However, at least half of all the nozzles 23 arrayed in each of the nozzle arrays 24D and 24E along the Y-axis are preferably positioned within the region in the ±X directions.

In this embodiment, the nozzle arrays 24D and 24E through which the black (K) ink, which has higher visibility than that of the cyan (C) ink, is discharged are both arranged between the nozzle arrays 24B and 24C and between nozzle arrays 24F and 24G through which the fluorescent-colored ink is discharged. Herein, the nozzle arrays 24D and 24E through which the black ink, which has high visibility, is discharged correspond to the third nozzle array; the nozzle arrays 24B and 24C through which fluorescent inks are discharged each correspond to a seventh fluorescent nozzle array; and the nozzle arrays 24F and 24G through which fluorescent-colored inks are discharged each correspond to an eighth fluorescent nozzle array. The ink of the first color, or the black (K) ink, discharged through the nozzle arrays 24D and 24E has the highest visibility among the inks discharged through the other nozzle arrays 24 in the recording head 2.

As described above, the nozzle arrays 24D and 24E through which the black (K1 and K2) inks are discharged are both arranged between the nozzle arrays 24B and 24G and between the nozzle arrays 24C and 24F through which fluorescent-colored inks are discharged. With this arrangement, the nozzle arrays 24D and 24E can be positioned closer to each other along the Y-axis. In addition, each of the nozzle arrays 24D and 24E can also be positioned closer to the center of the recording head 2 along the Y-axis than any of the nozzle arrays 24A, 24B, 24C, 24F, 24G, and 24H is. The black (K1 and K2) inks have higher visibility relative to the medium S than any of the cyan (C2 and C1) inks, the fluorescent yellow (FY1 and FY2) ink, and the fluorescent pink (FP1 and FP2) inks. Thus, the arrangement of the nozzle arrays 24D and 24E through which the black (K1 and K2) inks are discharged close to each other along the Y-axis makes it possible to suppress ink droplets discharged through the nozzle arrays 24D and 24E from deviating from the target locations on the medium S along the X-axis, thereby successfully achieving quality printing. For example, if two nozzle arrays 24 through which the same colored ink is discharged are positioned apart from each other along the Y-axis, when the recording head 2 is attached to the transport unit 7 in an angled position in the X-Y plane, namely, when the nozzles 23 are arrayed while inclined with respect to the X-axis, the locations at which the ink droplets discharged through the nozzle arrays 24 land on the medium S may be largely shifted from the target locations along the X-axis. In this case, if an ink having high visibility relative to the medium S is discharged through the two nozzle arrays 24, the above shift may become noticeable, thereby risking lowered print quality. As a nozzle array 24 is positioned farther from the center of the recording head 2 along the Y-axis, its nozzles are more shifted along the X-axis from corresponding nozzles in another nozzle array 24 positioned at the center of the recording head 2. In this embodiment, the nozzle arrays 24A and 24H through which the cyan (C2 and C1) inks are discharged are each positioned farthest from the center of the recording head 2 along the Y-axis. However, even if the locations at which the ink droplets discharged through the nozzle arrays 24A and 24H land on the medium S are shifted from the target locations, those dots supposedly become less noticeable because the visibility of the cyan (C) relative to the medium S is lower than that of the black (K). Thus, this arrangement successfully minimizes a lowered print quality.

In this embodiment, the nozzle array 24B through which the fluorescent yellow (FY1) ink is discharged and the nozzle array 24C through which the fluorescent pink (FP1) ink is discharged are arranged along the Y-axis between the nozzle array 24A through which the cyan (C1) ink is discharged and the nozzle array 24D through which the black (K1) ink is discharged. In this case, droplets of the cyan (C1) ink discharged through the nozzle array 24A and droplets of the black (K1) ink discharged through the nozzle array 24D create respective air curtains. Those curtains block mists generated from droplets of the fluorescent yellow (FY1) ink discharged through the nozzle array 24B and the fluorescent pink (FP1) ink discharged through the nozzle array 24C. As a result, those mists are less likely to move to the −Y-side of the air curtain of the cyan (C1) ink and the +Y-side of the air curtain of the black (K1) ink. In this way, this arrangement successfully suppresses the mists generated from droplets of the fluorescent yellow (FY1) ink discharged through the nozzle array 24B and the fluorescent pink (FP1) ink discharged through the nozzle array 24C from floating and spreading out inside the ink jet recording apparatus 1.

Likewise, in this embodiment, the nozzle array 24F through which the fluorescent pink (FP2) ink is discharged and the nozzle array 24G through which the fluorescent yellow (FY2) ink is discharged are arranged, along the Y-axis, between the nozzle array 24E through which the black (K2) ink is discharged and the nozzle array 24H through which the cyan (C2) ink is discharged. In this case, droplets of the black (K2) ink discharged through the nozzle array 24E and droplets of the cyan (C2) ink discharged through the nozzle array 24H create respective air curtains. Those curtains block mists generated from droplets of the fluorescent pink (FP2) ink discharged through the nozzle array 24F and the fluorescent yellow (FY2) ink discharged through the nozzle array 24G. As a result, those mists are less likely to move to the −Y-side of the air curtain of the black (K2) ink and the +Y-side of the air curtain of the cyan (C2) ink. In this way, this arrangement successfully suppresses the mists generated from droplets of the fluorescent pink (FP2) ink discharged through the nozzle array 24F and the fluorescent yellow (FY2) ink discharged through the nozzle array 24G from floating and spreading out inside the ink jet recording apparatus 1.

In this embodiment, the inks with the first color, the second color, the first fluorescent color, and the second fluorescent color, in other words, with the black (K), the cyan (C), the fluorescent yellow (FY), and the fluorescent pink (FP) colors, which are discharged from the recording head 2 configured above, preferably have viscosities and surface tensions falling within the variation range of ±10%. If the viscosities and surface tensions of the individual inks are set to within the variation range of ±10%, ink droplets of the inks do not greatly differ in weight, flying speed, and other characteristics from one another even when the pressure generators for the nozzle arrays 24 are driven by a common drive signal waveform. This configuration can eliminate the need to drive those pressure generators with different drive signal waveforms, in other words, can drive the pressure generators with a common drive signal waveform, thus achieving easily control of driving the pressure generators.

As described above, a recording head 2 in this embodiment, which is an example of a liquid ejecting head, includes: a first nozzle array and a second nozzle array through which a non-fluorescent-colored liquid is discharged; and one or more fluorescent nozzle arrays through which respective fluorescent-colored liquids are discharged. Further, the fluorescent nozzle arrays are arranged between the first nozzle array and the second nozzle array.

More specifically, the recording head 2 in this embodiment includes: a nozzle arrays 24H and 24A (first and second nozzle arrays) through which a cyan (C) ink (non-fluorescent-colored liquid) is discharged; nozzle arrays 24B and 24G (fluorescent nozzle arrays) through which a fluorescent yellow (FY) ink (liquid) is discharged; and nozzle arrays 24C and 24F (fluorescent nozzle arrays) through which a fluorescent pink (FP) ink (fluorescent-colored liquid) is discharged. Further, the nozzle arrays 24B, 24C, 24F, and 24G (fluorescent nozzle arrays) are arranged between the nozzle arrays 24A and 24H (first and second nozzle arrays).

As described above, the fluorescent nozzle arrays through which the fluorescent-colored inks are discharged are all arranged between the first nozzle array and the second nozzle array through which the non-fluorescent-colored ink is discharged. This arrangement successfully reserves a relatively wide nozzle surface on both sides of each of the fluorescent nozzle arrays. In this case, when the fluorescent-colored ink is discharged in droplet form from each fluorescent nozzle array, a mist to which the ink droplets has turned adheres to the nozzle surface. Therefore, it is possible to suppress this mist from floating and spreading out inside the ink jet recording apparatus 1.

In the recording head 2, ink droplets discharged successively from each of the first nozzle array and the second nozzle array generate an airflow, which acts as an air curtain. In this case, the mist to which droplets of the fluorescent-colored ink discharged through each fluorescent nozzle array have turned is less likely to spread out to the outside of the air curtains created by the ink droplets discharged from the first nozzle array and the second nozzle array. In other words, the mist to which the droplets of the fluorescent-colored ink discharged through each fluorescent nozzle array have turned is likely to stay within the region defined by the air curtains. Therefore, this configuration successfully suppresses the fluorescent-colored ink from floating and spreading out in mist form inside the ink jet recording apparatus 1. It should be noted that fluorescent-colored inks tend to turn to mist at a higher rate than non-fluorescent-colored inks.

As described above, the fluorescent nozzle arrays through which the fluorescent-colored inks are discharged in droplet form are all arranged between the first nozzle array and the second nozzle array through which the non-fluorescent-colored ink is discharged in droplet form. This arrangement can form a non-fluorescent-colored ink dot over a fluorescent-colored ink dot on a medium S. Forming a non-fluorescent-colored ink dot over a fluorescent-colored ink dot in this manner successfully provides the non-fluorescent color with a fluorescent property and controls a coloring property of the non-fluorescent color.

In the recording head 2 according to this embodiment, a color of the non-fluorescent-colored liquid discharged through the first nozzle array and the second nozzle array may be cyan. The fluorescent nozzle arrays may include one or more first fluorescent nozzle arrays through which a fluorescent yellow liquid is discharged.

More specifically, in the recording head 2 according to this embodiment, a color of the ink (liquid) discharged from the nozzle array 24H (first nozzle array) and the nozzle array 24A (second nozzle array) may be cyan (C). The fluorescent nozzle arrays may include the nozzle arrays 24B and 24G (first fluorescent nozzle arrays) through which the fluorescent yellow (FY) ink (liquid) is discharged. This arrangement can form a non-fluorescent cyan (C) ink dot over a fluorescent yellow (FY) ink dot on the medium S. Forming a non-fluorescent cyan (C) ink dot over a fluorescent yellow (FY) ink dot in this manner successfully provides the non-fluorescent cyan color with a fluorescent property and controls a fluorescent and coloring property of the cyan.

In the recording head 2 according to this embodiment, the fluorescent nozzle arrays may further include one or more second fluorescent nozzle arrays through which a fluorescent pink liquid is discharged.

More specifically, in the recording head 2 according to this embodiment, the fluorescent nozzle arrays may include the nozzle arrays 24C and 24F (second fluorescent nozzle arrays) through which the fluorescent pinks FP (FP1 and FP2) inks (liquids) are discharged. This arrangement can form a non-fluorescent cyan (C) ink dot over a fluorescent pink (FP) ink dot on the medium S. Forming a non-fluorescent cyan (C) ink dot over a fluorescent pink (FP) ink dot in this manner successfully provides the non-fluorescent cyan color with a fluorescent property and controls a fluorescent and coloring property of the cyan.

In the recording head 2 according to this embodiment, the first fluorescent nozzle arrays may include a third fluorescent nozzle array and a fourth fluorescent nozzle array through which the fluorescent yellow liquid is discharged. The second fluorescent nozzle arrays may be arranged between the third fluorescent nozzle array and the fourth fluorescent nozzle array.

More specifically, in the recording head 2 according to this embodiment, the first fluorescent nozzle arrays may include the nozzle array 24B (third fluorescent nozzle array) and the nozzle array 24G (fourth fluorescent nozzle array) through which the fluorescent yellow (FY) ink (liquid) is discharged. Furthermore, the second fluorescent nozzle arrays through which the fluorescent pink (FP) liquid is discharged may be arranged between the third fluorescent nozzle array and the fourth fluorescent nozzle array through which the fluorescent yellow (FY) liquid is discharged.

As described above, the second fluorescent nozzle arrays through which the fluorescent pink (FP) ink is discharged may be arranged between the third fluorescent nozzle array and the fourth fluorescent nozzle array through which the fluorescent yellow (FY) ink is discharged. In this case, the second fluorescent nozzle arrays through which the fluorescent pink (FP) ink is discharged are positioned relatively close to the center of the recording head 2 along the Y-axis. This configuration can suppress droplets of the fluorescent pink (FP) ink discharged through the second fluorescent nozzle arrays from being shifted from the target locations on the medium S, thereby successfully providing a quality image. A reason for this is that, if the medium S has a whitish color, the fluorescent pink (FP) has higher visibility relative to the medium S than that of the fluorescent yellow (FY).

The recording head 2 in this embodiment may further include a third nozzle array through which a black liquid is discharged. The second fluorescent nozzle arrays may include a fifth fluorescent nozzle array and a sixth fluorescent nozzle array through which the fluorescent pink liquid is discharged. Further, the third nozzle array may be disposed between the fifth fluorescent nozzle array and the sixth fluorescent nozzle array.

More specifically, the recording head 2 according to this embodiment may further include the nozzle arrays 24D and 24E (third nozzle array) through which the black (K) ink (liquid) is discharged. The second fluorescent nozzle arrays may include the nozzle array 24C (fifth fluorescent nozzle array) and the nozzle array 24F (sixth fluorescent nozzle array) through which the fluorescent pink liquid is discharged. Further, the nozzle arrays 24D and 24E (third nozzle array) through which the black (K) liquid is discharged may be disposed between the fifth fluorescent nozzle array and the sixth fluorescent nozzle through which the fluorescent pink (FP) liquid is discharged. In this case, if the medium S has a whitish color, the nozzle arrays 24D and 24E through which the black (K1 and K2) ink having high visibility relative to the medium S is discharged are positioned relatively close to the center of the recording head 2 along the Y-axis. This configuration can suppress droplets of the black (K1 and K2) inks discharged through the nozzle arrays 24D and 24E from being shifted from the target locations on the medium S, thereby successfully providing a quality image on the medium S.

The recording head 2 in this embodiment may further include a third nozzle array through which a non-fluorescent-colored liquid with a first color is discharged. The non-fluorescent-colored liquid discharged through the first nozzle array and the second nozzle array may have a second color different from the first color. An image with the first color on a print medium may have higher visibility than that with the second color on the print medium. The fluorescent nozzle arrays may include one or more seventh fluorescent nozzle array and one or more eighth fluorescent nozzle arrays through which the fluorescent-colored liquids are discharged. The seventh fluorescent nozzle arrays and the eighth fluorescent nozzle arrays may be arranged between the first nozzle array and the second nozzle array. The third nozzle array may be disposed between the seventh fluorescent nozzle arrays and the eighth fluorescent nozzle arrays. More preferably, the third nozzle array disposed between a group formed by all the seventh fluorescent nozzle arrays and a group formed by all the seventh fluorescent nozzle arrays.

More specifically, the recording head 2 according to this embodiment may further include the nozzle arrays 24D and 24E (third nozzle array) through which the first non-fluorescent color (black (K) liquid) is discharged. The ink (liquid) discharged through the nozzle array 24H (first nozzle array) and the nozzle array 24A (second nozzle array) has the cyan (C) color (second color) different from the black color. The first color may have higher visibility relative to an image formed on a medium S (print medium) than that of the second color. The fluorescent nozzle arrays may include: the nozzle arrays 24B and 24C (seventh fluorescent nozzle arrays) and the nozzle arrays 24F and 24G (eighth fluorescent nozzle arrays) through which the fluorescent yellow (FY) ink and the fluorescent pink (FP) ink (fluorescent color liquids), respectively, are discharged. The seventh fluorescent nozzle arrays and the eighth fluorescent nozzle arrays through which the fluorescent-colored liquids are discharged may be arranged between the first nozzle array and the second nozzle array through which a liquid with the second color having lower visibility than that with the first color. The third nozzle array through which the liquid with the first color having higher visibility than that with the second color may be disposed between the seventh fluorescent nozzle arrays and the eighth fluorescent nozzle arrays through which the fluorescent-colored liquids are discharged. In this case, the third nozzle array through which the liquid with the first color having high visibility is discharged is disposed between the seventh fluorescent nozzle arrays and the eighth fluorescent nozzle arrays, all of which are arranged between the first nozzle array and the second nozzle array. The color sequence in which the nozzle arrays 24 are arranged may be set symmetrically along the Y-axis when the third nozzle array through which the ink with the first color having high visibility (black (K) ink) is discharged is aligned with the center of the recording head 2 along the Y-axis. This color sequence can achieve quality printing at a high speed and resolution. If a plurality of third nozzle arrays (nozzle arrays 24D and 24E) through the black (K) ink is discharged are provided, the nozzle arrays 24D and 24E can be positioned relatively close to each other. This arrangement can suppress ink droplets discharged through the nozzle arrays 24D and 24E from being shifted from the target locations on the medium S, thereby successfully providing a quality image on the medium S.

In the recording head 2 according to this embodiment, the seventh fluorescent nozzle arrays may include: the third fluorescent nozzle array through which the first fluorescent-colored liquid is discharged; and the fifth fluorescent nozzle array through which the second fluorescent-colored liquid different in color from the first fluorescent-colored liquid is discharged. The eighth fluorescent nozzle arrays may include: the sixth fluorescent nozzle array through which the second fluorescent color is discharged and the fourth fluorescent nozzle array through which the first fluorescent color is discharged. An image with the second fluorescent-colored liquid on a print medium may have higher visibility than that with the first fluorescent-colored liquid on the print medium. The fifth fluorescent nozzle array and the sixth fluorescent nozzle array may be arranged between the third fluorescent nozzle array and the fourth fluorescent nozzle array.

More specifically, in the recording head 2 according to this embodiment, the seventh fluorescent nozzle arrays through which fluorescent-colored inks (liquids) are discharged may include: the nozzle array 24B (third fluorescent nozzle array) through which the fluorescent yellow (FY) liquid (first fluorescent color liquid) is discharged; and the nozzle array 24C (fifth fluorescent nozzle array) through which the fluorescent pink (FP) liquid (liquid with the second fluorescent color different from the first fluorescent color) is discharged. The eighth fluorescent nozzle arrays through which the fluorescent-colored inks (liquids) are discharged include: the nozzle array 24F (sixth fluorescent nozzle array) through which the second fluorescent-colored liquid is discharged; and the nozzle array 24G (fourth fluorescent nozzle array) through which the first fluorescent-colored liquid is discharged. The fluorescent pink (FP) (second fluorescent color) may have higher visibility relative to an image formed a medium S (print medium) than the fluorescent yellow (FY) (first fluorescent color). The fifth fluorescent nozzle array and the sixth fluorescent nozzle array through which the second fluorescent-colored liquid is discharged may be arranged between the third fluorescent nozzle array and the fourth fluorescent nozzle array through which the first fluorescent-colored liquid is discharged. With this arrangement, the fifth fluorescent nozzle array and the sixth fluorescent nozzle array through which the fluorescent pink (FP) ink having high visibility than the fluorescent yellow (FY) may be positioned relatively close to the center of the recording head 2 along the Y-axis than that of the third fluorescent nozzle array and the fourth fluorescent nozzle array through which the fluorescent yellow (FY) ink is discharged are. This arrangement can suppress ink droplets of the fluorescent pink (FP) ink discharged through the fifth fluorescent nozzle array and the sixth fluorescent nozzle array from being shifted from the target locations on the medium S, thereby successfully providing a quality image on the medium S.

In this embodiment, the nozzle arrays 24D and 24E (third nozzle array) through which the black (K) ink is discharged is disposed between the nozzle array 24C (fifth fluorescent nozzle array) and the nozzle array 24F (sixth fluorescent nozzle array) through which fluorescent pink (FP) ink is discharged; however, the nozzle arrays 24D and 24E do not necessarily have to be disposed between the nozzle array 24C and the nozzle array 24F. Alternatively, as an example, the nozzle arrays 24C and 24F through which the fluorescent pink (FP) ink is discharged may be arranged between the nozzle arrays 24D and 24E through which the black (K) ink is discharged. As another example, the nozzle arrays 24D and 24E through which the black (K) ink is discharged and the nozzle arrays 24C and 24F through which the fluorescent pink (FP) ink is discharged may be alternatively arranged along the Y-axis.

In this embodiment, the recording head 2 has eight nozzle arrays 24, more specifically, the nozzle arrays 24A to 24H arranged from the −Y side to +Y side. Further, the recording head 2 discharges the cyan (C) ink through the nozzle arrays 24A and 24H, the fluorescent yellow (FY) ink through the nozzle arrays 24B and 24G, the fluorescent pink (FP) ink through the nozzle arrays 24C and 24F, and the black (K) ink through the nozzle arrays 24D and 24E. In this case, the sequence of the fluorescent yellow (FY), fluorescent pink (FP), and black (K) inks discharged through the nozzle arrays 24B to 24G arranged between the nozzle arrays 24A and 24H is not limited to the above. Even if the nozzle arrays 24B to 24G are arranged in any other sequence between the nozzle array 24H (first nozzle array) and the nozzle array 24A (second nozzle array), the recording head 2 can also suppress mists generated from the fluorescent yellow (FY), the fluorescent pink (FP), and the black (K) inks from floating and spreading out inside the ink jet recording apparatus 1 and further can form a non-fluorescent-colored ink dot over a fluorescent-colored ink dot on the medium S.

Second Embodiment

Figure 10:
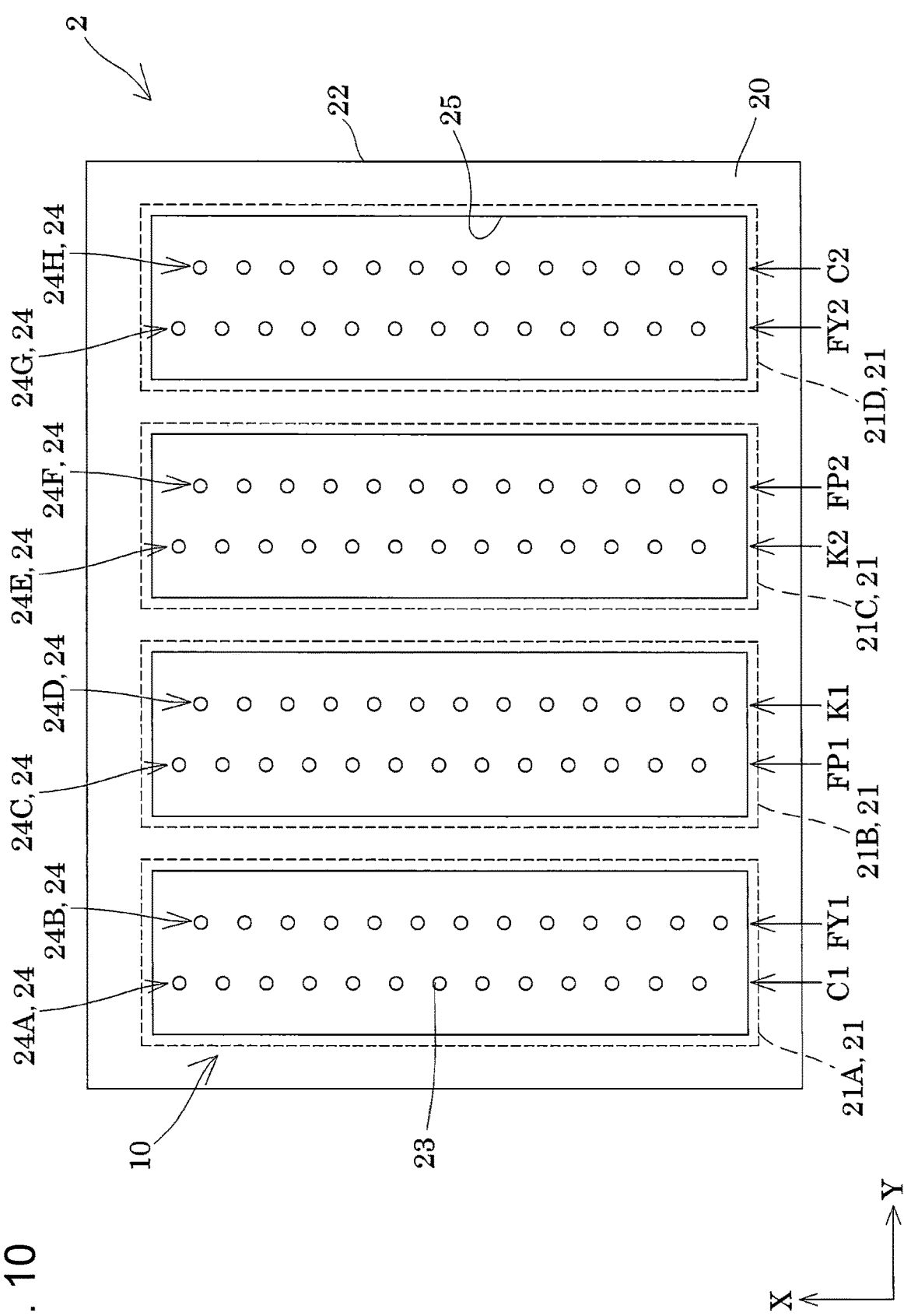
FIG. 10 is a plan view of a nozzle surface of a recording head according to a second embodiment of the present disclosure.

FIG. 10 is a plan view of a nozzle surface of an ink jet recording head 2 according to a second embodiment of the present disclosure, which is an example of a liquid ejecting head. Members that are the same as those in the foregoing first embodiment are given identical reference characters and will not be described.

As illustrated in FIG. 10, the ink jet recording head 2 according to this embodiment includes four drivers 21 and two nozzle arrays 24, each of which has an array of nozzles 23, provided in the each of the drivers 21; the ink jet recording head 2 is an example of a liquid ejecting head and referred to below simply as the recording head 2. Further, in each driver 21, the nozzles 23 of one nozzle array 24 are shifted in the +X or −X direction from the corresponding nozzles 23 of the other nozzle array 24. In other words, the nozzle arrays 24 in each driver 21 are arranged in a stagger fashion. In this embodiment, the nozzles 23 in one nozzle array 24 are shifted in the +X or −X direction from the corresponding nozzles 23 in the other nozzle array 24 by half an interval between the nozzles 23 in each nozzle array 24. More specifically, in each driver 21, the nozzle array 24 positioned on the +Y-side is shifted from the nozzle array 24 positioned on the −Y-side by half the dot interval in the −X direction. In this case, for example, if the nozzles 23 of one nozzle array 24 are formed so as to achieve a resolution of 300 dpi, all the nozzles 23 of the two nozzle arrays 24 can achieve a resolution of 600 dpi.

In this embodiment, of nozzle arrays 24, nozzle arrays 24A, 24C, 24E, and 24G, which are positioned on the −Y-sides in the respective drivers 21, have nozzles 23 arrayed along the X-axis. Likewise, of nozzle arrays 24, nozzle arrays 24B, 24D, 24F, and 24H, which are positioned on the +Y-sides in the respective drivers 21, have nozzles 23 arrayed along the X-axis. Further, as described above, the nozzle array 24B, 24D, 24F, and 24H are shifted from the nozzle array 24A, 24C, 24E, and 24G by half the dot interval in the −X direction.

The recording head 2 discharges inks through the nozzle arrays 24A to 24H arranged above, as in the foregoing first embodiment. In this case, the two nozzle arrays 24 through which the same colored ink is discharged are shifted from each other by half the dot interval along the X-axis. When discharging the same colored ink through two nozzle arrays 24, the recording head 2 can achieve printing at a resolution twice as high as that when discharging ink through a single nozzle array 24.

In the recording head 2 configured above, similar to the foregoing first embodiment, the nozzle arrays 24B and 24G through first fluorescent-colored (FY or FY1 and FY2) inks are discharged and the nozzle arrays 24C and 24F through which second fluorescent-colored (FP or FP1 and FP2) inks are discharged are all arranged between the nozzle arrays 24A and 24H through which non-fluorescent-colored (C, C2 or C1) inks are discharged. This arrangement successfully suppresses mists that ink droplets discharged through the nozzle arrays 24B, 24C, 24F, and 24G have turned from floating and spreading out inside an ink jet recording apparatus 1. Thus, the second embodiment produces substantially the same effect as the foregoing first embodiment.

As described above, the nozzle arrays 24B, 24C, 24F, and 24G through which the fluorescent-colored (FY, or FY1 and FY2, and FP, or FP1 and FP2) inks are discharged are all arranged between the nozzle arrays 24A and 24H through which the non-fluorescent-colored (C or C2 and C1) inks are discharged. This arrangement successfully forms a non-fluorescent-colored ink dot over a fluorescent-colored ink dot on a medium S.

More specifically, when the recording head 2 discharges ink droplets onto the medium S while moving relative to the medium S in the +Y direction, the fluorescent yellow (FY1) ink discharged through the nozzle array 24B first lands on the medium S to form a dot FY1a thereon, and then the cyan (C1) ink discharged through the nozzle array 24A lands over the dot FY1a to form a dot C1a thereon, as in the example of the first embodiment illustrated in FIGS. 5 and 6. In this case, although the nozzles 23 in the nozzle array 24A are shifted from those in the nozzle array 24B by half the dot interval in the +X direction, the recording head 2 can form dots C1a of the cyan (C1) ink over dots FY1a of the fluorescent yellow (FY1) ink on the entire medium S except the margins on the ±X-sides, because inks discharged through the nozzles 23 spread out over the medium S. For example, the recording head 2 discharges droplets through all the nozzles 23 of the nozzle array 24B at one time. As a result, the dots FY1a of the fluorescent yellow (FY1) ink are formed throughout the medium S and joined together to form a first region along the X-axis. Then, the recording head 2 discharges droplets through all the nozzles 23 of the nozzle array 24A at one time. As a result, the dots C1a of the cyan (C1) ink are formed within the first region and joined together to form a second region along the X-axis, which is shifted from the first region by half the dot interval in the −X direction. In this way, the dots C1a of the cyan (C1) ink can be formed over the dots FY1a of the fluorescent yellow (FY1) ink within the entire print area, although a small region formed only of the dots C1a is present on the margin of the medium S on the +X-sides and a small region formed only of the dots FY1a is present on the margin of the medium S on the −X-sides. It should be noted that the configuration of the first embodiment which has been described with reference to FIGS. 7 to 9 is applicable to the second embodiment.

Other Embodiments

The first and second embodiments of the present disclosure have been described; however, basic configurations of the present disclosure are not limited to those described above.

Figure 11:
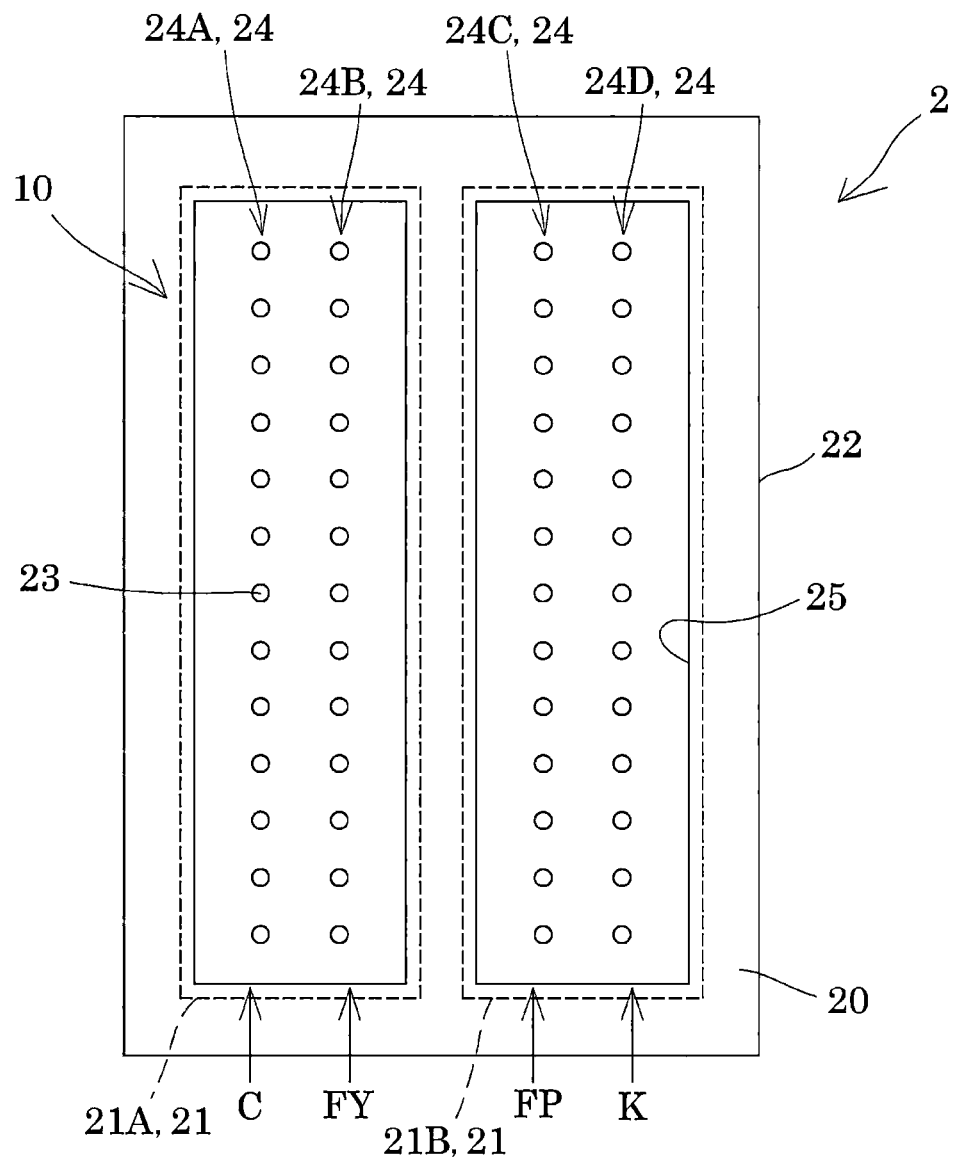
FIG. 11 is a plan view of a nozzle surface of a recording head according to a modification of the first or second embodiment of the present disclosure.

In the foregoing first embodiment, for example, eight nozzle arrays 24 are provided in the recording head 2; however, any other number of nozzle arrays 24 may be provided. FIG. 11 is a plan view of a nozzle surface of a recording head 2 according to a modification of the foregoing first or second embodiment.

As illustrated in FIG. 11, the recording head 2 has four nozzle arrays 24 arranged along the Y-axis. In this modification, the nozzle arrays 24 are also referred to as nozzle arrays 24A, 24B, 24C, and 24D in this order from the −Y-side to the +Y-side.

The recording head 2 discharges a cyan (C) ink through the nozzle array 24A, a fluorescent yellow (FY) ink through the nozzle array 24B, a fluorescent pink (FP) ink through the nozzle array 24C, and a black (K) ink through the nozzle array 24D.

In the above example, the nozzle array 24D through which the black (K) ink is discharged corresponds to a first nozzle array; the nozzle array 24A through which the cyan (C) ink is discharged corresponds to a second nozzle array; and the nozzle array 24B through which the fluorescent yellow (FY) ink is discharged and the nozzle array 24C through which the fluorescent pink (FP) ink is discharged correspond to the fluorescent nozzle arrays. Further, the nozzle arrays 24B and 24C (fluorescent nozzle arrays) are arranged between the nozzle array 24D (first nozzle array) and the nozzle array 24A (second nozzle array).

The above arrangement successfully suppresses mists to which droplets of the fluorescent-colored inks discharged through the first fluorescent nozzle array have turned from floating and spreading out inside the ink jet recording apparatus 1 and further forms a non-fluorescent-colored ink dot over a fluorescent-colored ink dot on the medium S, similar to the foregoing first embodiment.

In the ink jet recording apparatus 1 according to the foregoing first or second embodiment, the recording head 2 attached to the transport unit 7 moves in the main-scanning directions, or the ±Y directions; however, the mechanism for moving the recording head 2 is not limited to this example.

Alternatively, the recording head 2 may be fixed, and instead, the medium S such as a paper sheet may move in the sub-scanning direction during the printing. In short, a line type recording apparatus may be used. When this line type recording apparatus operates, an airflow is generated in the direction in which the medium S is fed, or in the sub-scan direction. Thus, the recording head 2 may be configured such that the fluorescent nozzle arrays through which the fluorescent-colored liquids are discharged are positioned in the upstream side in the feed direction of the medium S and such that the nozzle arrays through which the non-fluorescent-colored liquids are discharged are positioned downstream of the fluorescent nozzle arrays in the feed direction of the medium S. In other words, the nozzle arrays through which the non-fluorescent-colored liquids are discharged do not necessarily have to be positioned upstream of the fluorescent nozzle arrays in the feed direction of the medium S. As described above, the nozzle arrays through which the non-fluorescent-colored liquids are discharged are positioned downstream of the fluorescent nozzle arrays in the feed direction of the medium S. This arrangement successfully suppresses mists to which droplets of the fluorescent-colored liquids discharged through the fluorescent nozzle arrays have turned from flowing to the downstream side along an airflow generated by the feeding of the medium S. In this way, it is possible to suppress the mists to which droplets of the fluorescent-colored liquids discharged through the fluorescent nozzle arrays have turned from floating and spreading out inside the ink jet recording apparatus 1.

In the ink jet recording apparatus 1 according to the foregoing first or second embodiment, each of colored inks used is discharged through two nozzle arrays. Alternatively, one or more of the colored inks used may be discharged through one or three or more nozzle arrays. However, the color sequence of inks discharged from the recording head 2 through the nozzle arrays 24 is preferably set symmetrically along the Y-axis, because this color sequence makes it possible to achieve a quality image and high-speed printing more easily, as in the foregoing first and second embodiments.

In the ink jet recording apparatus 1 according to the foregoing first or second embodiment, the fluorescent nozzle arrays include the nozzle arrays 24B, 24C, 24F, and 24G. In this case, however, the fluorescent nozzle arrays only have to need at least one of the nozzle arrays 24B, 24C, 24F, and 24G.

In the ink jet recording apparatus 1 according to the foregoing first or second embodiment, the second fluorescent nozzle arrays include both the nozzle arrays 24C and 24F. In this case, however, the second fluorescent nozzle array only needs to include one of the nozzle arrays 24C and 24F.

In the ink jet recording apparatus 1 according to the foregoing first or second embodiment, the fluorescent nozzle arrays include: the nozzle arrays 24B and 24C as the seventh fluorescent nozzle arrays; and the nozzle arrays 24F and 24G as the eighth fluorescent nozzle arrays. The fluorescent color liquids are discharged through the seventh and eight fluorescent nozzle arrays. More specifically, the fluorescent yellow (FY) inks are discharged through the nozzle arrays 24B and 24G, whereas the fluorescent pink (FP) inks are discharged through the nozzle arrays 24C and 24F. In this case, however, the seventh fluorescent nozzle arrays only need to include one of the nozzle arrays 24B and 24C, and the eighth fluorescent nozzle arrays only need to include one of the nozzle arrays 24F and 24G.

In the foregoing first or second embodiment, the recording head 2 uses cyan and black inks as the non-fluorescent-colored liquids; however, the recording head 2 may use any other fluorescent-colored inks. Moreover, the recording head 2 uses the fluorescent yellow and fluorescent pink inks as the fluorescent-colored liquids; however, the recording head 2 may use any other fluorescent-colored inks.

The present disclosure is applicable to various types of liquid ejecting heads. For example, the present disclosure has applications including: recording heads, such as ink jet recording heads, used for printers and other image recording apparatuses; color material ejecting heads used to manufacture color filters for liquid crystal displays or other apparatuses with screens; electrode material ejecting heads used to manufacture electrodes for organic electroluminescence displays (OELDs), field emission displays (FEDs), and other similar displays; and bioorganic substance ejecting heads used to manufacture biochips. Those liquid ejecting heads may be used as examples of the liquid ejecting apparatus, instead of the ink jet recording apparatus 1 described above.

What is claimed is:

1. A liquid ejecting head comprising:
    a first nozzle array though which a non-fluorescent-colored liquid is discharged;
    a second nozzle array through which a non-fluorescent-colored liquid is discharged; and
    one or more fluorescent nozzle arrays through which respective fluorescent-colored liquids are discharged and which are aligned along an X direction,
    wherein the one or more fluorescent nozzle arrays are arranged between the first nozzle array and the second nozzle array,
    wherein at least a half-length of the one or more fluorescent nozzle arrays are aligned in the same position in the X direction as the first nozzle array and the second nozzle array, and
    wherein the first nozzle array, the one or more fluorescent nozzle arrays, and the second nozzle array are arranged in this order along a Y direction which is a crossing direction with the X direction.

2. The liquid ejecting head according to claim 1, wherein a color of the non-fluorescent-colored liquid discharged through the first nozzle array and the second nozzle array is cyan, and
    the fluorescent nozzle arrays include one or more first fluorescent nozzle arrays through which a fluorescent yellow liquid is discharged.

3. The liquid ejecting head according to claim 2, wherein the fluorescent nozzle arrays further include one or more second fluorescent nozzle arrays through which a fluorescent pink liquid is discharged.

4. The liquid ejecting head according to claim 3, wherein the first fluorescent nozzle arrays include a third fluorescent nozzle array and a fourth fluorescent nozzle array through which the fluorescent yellow liquid is discharged, and
    the second fluorescent nozzle arrays are arranged between the third fluorescent nozzle array and the fourth fluorescent nozzle array.

5. The liquid ejecting head according to claim 4, further comprising a third nozzle array through which a black liquid is discharged, wherein
    the second fluorescent nozzle arrays include a fifth fluorescent nozzle array and a sixth fluorescent nozzle array through which the fluorescent pink liquid is discharged, and
    the third nozzle array is disposed between the fifth fluorescent nozzle array and the sixth fluorescent nozzle array.

6. The liquid ejecting head according to claim 1, further comprising a third nozzle array through which a non-fluorescent-colored liquid with a first color is discharged, wherein
    the non-fluorescent-colored liquid discharged through the first nozzle array and the second nozzle array has a second color, the second color being different from the first color,
    an image with the first color on a print medium has higher visibility than that with the second color on the print medium,
    the fluorescent nozzle arrays include one or more seventh fluorescent nozzle arrays and one or more eighth fluorescent nozzle arrays through which the fluorescent-colored liquids are discharged,
    the seventh fluorescent nozzle arrays and the eighth fluorescent nozzle arrays are arranged between the first nozzle array and the second nozzle array, and
    the third nozzle array is disposed between the seventh fluorescent nozzle arrays and the eighth fluorescent nozzle arrays.

7. The liquid ejecting head according to claim 6, wherein the seventh fluorescent nozzle arrays include: a third fluorescent nozzle array through which the first fluorescent-colored liquid is discharged; and a fifth fluorescent nozzle array through which the second fluorescent-colored liquid different in color from the first fluorescent-colored liquid is discharged,
    the eighth fluorescent nozzle arrays include: a sixth fluorescent nozzle array through which the second fluorescent-colored liquid is discharged and a fourth fluorescent nozzle array through which the first fluorescent-colored liquid is discharged,
    an image with the second fluorescent-colored liquid on a print medium has higher visibility than that with the first fluorescent-colored liquid on the print medium, and
    the fifth fluorescent nozzle array and the sixth fluorescent nozzle array are arranged between the third fluorescent nozzle array and the fourth fluorescent nozzle array.

8. A liquid ejecting apparatus comprising the liquid ejecting head according to claim 1.

9. A liquid ejecting head comprising:
    a first nozzle array through which a non-fluorescent-colored liquid is discharged;
    a second nozzle array through which a non-fluorescent-colored liquid is discharged; and
    one or more fluorescent nozzle arrays through which respective fluorescent-colored liquids are discharged,
    wherein the one or more fluorescent nozzle arrays are arranged between the first nozzle array and the second nozzle array, and
    wherein the fluorescent nozzle arrays include one or more first fluorescent nozzle arrays through which a fluorescent yellow liquid is discharged.

10. The liquid ejecting head according to claim 9, wherein colors of the non-fluorescent-colored liquid discharged through the first nozzle array and the second nozzle array are cyan.

11. A liquid ejecting head comprising:
    a first nozzle array through which a non-fluorescent-colored liquid is discharged;
    a second nozzle array through which a non-fluorescent-colored liquid is discharged; and one or more fluorescent nozzle arrays through which respective fluorescent-colored liquids are discharged, wherein the one or more fluorescent nozzle arrays are arranged between the first nozzle array and the second nozzle array, and wherein the fluorescent nozzle arrays include one or more first fluorescent nozzle arrays through which a fluorescent pink liquid is discharged.

12. The liquid ejecting head according to claim 11, wherein colors of the non-fluorescent-colored liquid discharged through the first nozzle array and the second nozzle array are cyan.

13. The liquid ejecting head according to claim 11, wherein the non-fluorescent-colored liquid discharged through the first nozzle array has a first color, and the non-fluorescent-colored liquid discharged through the second nozzle array has a second color being different from the first color.

14. The liquid ejecting head according to claim 13, wherein the first color is black, and the second color is cyan.

15. The liquid ejecting head according to claim 11, wherein one or more fluorescent nozzle arrays through which respective fluorescent-colored liquids are discharged are aligned along a X direction, and at least a half-length of the one or more fluorescent nozzle arrays are aligned in the same position in the X direction with the first nozzle array and the second nozzle array.

16. The liquid ejecting head according to claim 15, wherein the first nozzle array, the one or more fluorescent nozzle arrays, and the second nozzle array are arranged in this order along a Y direction which is a crossing direction with the X direction.

17. A liquid ejecting apparatus comprising the liquid ejecting head according to claim 11.

* * * * *